United States Patent [19]

Adams et al.

[11] 3,855,244

[45] Dec. 17, 1974

[54] XANTHEN DERIVATIVES

[76] Inventors: Stewart Sanders Adams; Bernard John Armitage; Norman William Bristow; Bernard Vincent Heathcote, all of 1 Thame Rd. West, Nottingham, England

[22] Filed: Mar. 26, 1973

[21] Appl. No.: 344,570

Related U.S. Application Data

[63] Continuation-in-part of Ser. No. 191,110, Oct. 20, 1971, abandoned, which is a continuation-in-part of Ser. No. 662,587, Aug. 23, 1967, Pat. No. 3,644,420.

[30] Foreign Application Priority Data
Sept. 2, 1966    Great Britain .................... 39384/66
Apr. 5, 1967    Great Britain .................... 15692/67

[52] U.S. Cl. ............................................. 260/335
[51] Int. Cl. ............................................. C07d 7/42
[58] Field of Search .................................. 260/335

*Primary Examiner*—Norma S. Milestone
*Attorney, Agent, or Firm*—Gordon W. Hueschen

[57] ABSTRACT

Esters of N-hydroxy-N-9-xanthenylureas and substituted derivatives thereof useful in the treatment of peptic ulcer.

8 Claims, No Drawings

XANTHEN DERIVATIVES

This application is a continuation-in-part of U.S. Pat. application Ser. No. 191,110, filed Oct. 20, 1971 and now abandoned, all of the disclosure of which is incorporated herein, itself a continuation-in-part of U.S. Pat. application Ser. No. 662,587, filed Aug. 23, 1967, now U.S. Pat. No. 3,644,420, the disclosure of which is incorporated herein by reference.

According to the present invention there are provided compounds of formula I

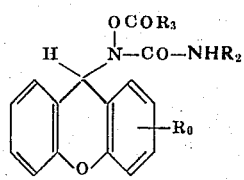

in which $R_0$ is hydrogen, halogen, alkoxy or alkyl;

$R_2$ is hydrogen, alkyl, alkanoyloxyalkyl, alkoxyalkyl or alkanoyl;

and $R_3$ is hydrogen, alkyl containing 1-17 carbon atoms, cycloalkyl, alkoxyalkyl, alkylthioalkyl, phenoxyalkyl, phenylalkyl, cycloalkylalkyl, alkoxycarbonylalkyl, alkoxycarbonyl, phenyl, phenylamino, alkylamino, 2-furyl, 3-furyl, 2-thienyl, 3-thienyl, 2-pyridyl, 3-pyridyl, 4-pyridyl, 2-tetrahydrofuryl, 3-tetrahydrofuryl, 2-tetrahydrothienyl, 3-tetrahydrothienyl, 2-benzofuryl, 3-benzofuryl, 2-benzothienyl, 3-benzothienyl, benzothiazolyl, alkenyl, alkoxy, alkoxyalkoxy, phenoxyalkoxy, cycloalkylalkoxy, alkoxycarbonylalkoxy, halogenated alkoxy, cyanoalkoxy, alkoxyalkoxyalkoxy, nitroalkoxy, phenylalkoxy, phenoxy, alkenyloxy, alkynyloxy, or cycloalkoxy;

and wherein the terms "alkyl," "cycloalkyl," "alkoxy," "alkylthio," "alkenyl," "alkenyloxy," "alkynyloxy," "cycloalkoxy," "alkanoyl" and "alkanoyloxy" indicate such groups containing up to seven carbon atoms (unless otherwise specified).

The compounds of formula I are preferably prepared by O-acylation of the corresponding hydroxy compounds of formula II

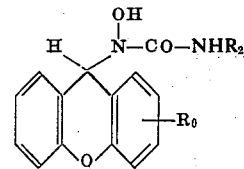

in which $R_0$ and $R_2$ are as hereinbefore defined, using standard acylating agents such as acid anhydrides, acid halides and isocyanates (to give carbamoyl esters).

It has been found that compounds of formula I are anti-secretory agents, with a specific activity against gastric secretion and without any anticholinergic activity. The anti-secretory activity has been demonstrated in the stimulated, pylorus-ligated rat, and varies with the values of $R_0$, $R_2$ and $R_3$.

The compounds of the invention may be administered orally, rectally or parenterally, preferably orally, the optimum dosage rate varying with the activity of the compounds. A preferred dosage rate for oral administration is of the order of 0.025–2 g. daily, optionally in divided doses.

In use, the compounds of the invention are administered in conventional formulations, and therefore, according to a further aspect of the invention there are provided therapeutic compositions which comprise a compound of the hereinbefore described formula I in association with pharmaceutical excipients known for the production of compositions suitable for oral, rectal or parenteral administration.

The compositions of the invention preferably contain 0.1 – 90 percent by weight of a compound of formula I.

Compositions for oral administration are the preferred compositions of the invention, and these are the known pharmaceutical forms for such administration, such as for example tablets, capsules, syrups and aqueous and oily suspensions. The excipients used in the preparation of these compositions are the excipients known in the pharmacist's art. Preferred compositions are tablets wherein a compound of formula I is mixed with an inert diluent such as calcium phosphate in the presence of disintegrating agents, e.g. maize starch and lubricating agents e.g. magnesium stearate. Such tablets may, if desired, be provided with enteric coatings by known methods, for example by the use of cellulose acetate phthalate. Similarly capsules, for example hard or soft gelatin capsules, containing a compound of formula I, with or without other excipients, may be prepared by conventional means and, if desired, provided with enteric coatings in known manner. The tablets and capsules may conveniently each contain 25 – 500 mg. of a compound of formula I. Other compositions for oral administration include for example aqueous suspensions containing a compound of formula I in aqueous media in the presence of a non-toxic suspending agent e.g. sodium carboxymethylcellulose and dispersing agents, and oily suspensions containing a compound of formula I in a vegetable oil for example arachis oil.

Compositions of the invention suitable for rectal administration are the known pharmaceutical forms for such administration, such as for example suppositories with cocoa butter or polyethylene glycol bases.

Compositions of the invention suitable for parenteral administration are the known pharmaceutical forms for such administration, for example sterile suspensions in aqueous and oily media or sterile solutions in propylene glycol.

In the compositions of the invention the compounds of formula I may if desired be associated with other compatible pharmacologically active ingredients. For example antacids and acid absorbents such as aluminium hydroxide and magnesium trisilicate may be included in compositions for oral administration to give an immediate antacid effect. Other pharmacologically active agents which may be associated with the compounds of formula I include compounds active on the central nervous system, including short and long acting sedatives such as the barbiturates and methaqualone, antihistaminic and/or antiemetic agents such as cyclizine and diphenhydramine, and anti-cholinergic agents such as atropine.

Milk and milk solids are valuable in the treatment of peptic ulcer, and the compositions of the invention include liquid and solid compositions based on milk and milk solids.

In some formulations it may be beneficial to use the compounds of formula I in the form of particles of very small size, such as for example, as obtained by fluid energy milling.

According to another aspect of the invention there is provided a method of treating peptic ulcer which comprises administering to a patient 0.025–2 grams daily of a compound of formula I; in a preferred embodiment of this aspect of the invention, administration is by the oral route.

The starting materials employed in the preparation of compounds of formula I, together with methods for their preparation, are described in our U.S. Pat. application Ser. No. 662,587 filed Aug. 23, 1967, now U.S. Pat. No. 3,644,420, of which the present application is a continuation-in-part.

The following non-limitative examples illustrate the invention.

EXAMPLE 1

Acetic anhydride (0.015 mole) was added to a solution of N-hydroxy-N-9-xanthenylurea (0.01 mole) in dry pyridine (25 ml.). The mixture was shaken and left at room temperature overnight. After dilution with ice-water (250 ml.), the solid was collected and dried at room temperature. It was dissolved in the minimum amount of acetone, filtered, diluted with light petroleum (250 ml., b.p. 40°–60°C.) and cooled to 0°C. The solid obtained was dried at room temperature to give N-acetoxy-N-9-xanthenylurea, m.p. 172°–173° C.

In a similar manner the following compounds are prepared using the appropriate acid anhydride:

N-propionyloxy-N-9-xanthenylurea, m.p. 172°–174° C.

N-butyryloxy-N-9-xanthenylurea, m.p. 176°–177° C.

N-methoxyacetoxy-N-9-xanthenylurea, m.p. 150°–151° C.

N-crotonyloxy-N-9-xanthenylurea, m.p. 164°–167° C.

N-methylthioacetoxy-N-9-xanthenylurea, m.p. 152°–158° C.

N-cyclopropanecarbonyloxy-N-9-xanthenylurea, m.p. 163° C.

N-acetoxy-N'-methyl-N-9-xanthenylurea, m.p. 157°–159° C.

N-propionyloxy-N'-methyl-N-9-xanthenylurea, m.p. 136°–138° C.

N-butyryloxy-N'-methyl-N-9-xanthenylurea, m.p. 158°–161° C.

N-methoxyacetoxy-N'-methyl-N-9-xanthenylurea, m.p. 161°–164° C.

N-acetoxy-N'-ethyl-N-9-xanthenylurea, m.p. 162°–164° C.

N'-ethyl-N-methoxyacetoxy-N-9-xanthenylurea m.p. 127°–128° C.

N-acetoxy-N'-propyl-N-9-xanthenylurea, m.p. 134° C.

N-methoxyacetoxy-N'-propyl-N-9-xanthenylurea, m.p. 116°–117° C.

N-acetoxy-N'-butyl-N-9-xanthenylurea, m.p. 121°–122° C.

N-acetoxy-N'-t-butyl-N-9-xanthenylurea, m.p. 151°–152° C.

N-acetoxy-N'-acetyl-N-9-xanthenylurea, m.p. 145°–149° C.

N-acetoxy-N'-(2-acetoxyethyl)-N-9-xanthenylurea, m.p. 132°–134° C.

N'-(2-acetoxyethyl)-N-methylthioacetoxy-N-9-xanthenylurea m.p. 113°–114° C.

N'-(2-acetoxyethyl)-N-(2-furoyloxy)-N-9-xanthenylurea, m.p. 148°–151° C.

N-acetoxy-N-(1-fluoro-9-xanthenyl)urea, m.p. 185°–187° C.

N-(2-furoyloxy)-N-(1-fluoro-9-xanthenyl)urea, m.p. 189°–190° C.

N-(1-fluoro-9-xanthenyl)-N-methylthioacetoxyurea, m.p. 178° C.

N-acetoxy-N-(1-fluoro-9-xanthenyl)-N'-methylurea, m.p. 158°–159° C.

N-acetoxy-N'-ethyl-N-(1-fluoro-9-xanthenyl)urea, m.p. 175°–177° C.

N-acetoxy-N-(1-fluoro-9-xanthenyl)-N'-propylurea, m.p. 164°–165° C.

N-acetoxy-N'-butyl-N-(1-fluoro-9-xanthenyl)urea, m.p. 138°–139° C.

N-acetoxy-N'-acetyl-N-(1-fluoro-9-xanthenyl)urea, m.p. 169°–171° C.

N-acetoxy-N'-(2-acetoxyethyl)-N-(1-fluoro-9-xanthenyl)urea, m.p. 136°–137° C.

N-acetoxy-N-(1-methoxy-9-xanthenyl)urea, m.p. 175°–176° C.

N-acetoxy-N-(1-methoxy-9-xanthenyl)-N'-methylurea, m.p. 199°–200° C.

N-acetoxy-N'-butyl-N-(1-methoxy-9-xanthenyl)urea, m.p. 168°–170° C.

N-acetoxy-N'-(2-acetoxyethyl)-N-(1-methoxy-9-xanthenyl)urea, m.p. 160°–162° C.

N-acetoxy-N-(2-methyl-9-xanthenyl)urea, m.p. 168°–169° C.

N-acetoxy-N'-(2-methoxyethyl)-N-9-xanthenylurea, m.p. 135°–136° C.

N-(2-furoyloxy)-N'-(2-methoxyethyl)-N-9-xanthenylurea, m.p. 138°–140° C.

N-methoxyacetoxy-N'-(2-methoxyethyl)-N-9-xanthenylurea, m.p. 115.5°–117° C.

N-crotonyloxy-N'-(2-methoxyethyl)-N-9-xanthenylurea, m.p. 137°–139° C.

N-acetoxy-N-(1-methyl-9-xanthenyl)-N'-methylurea, m.p. 196°–197° C.

N-acetoxy-N-(1-methyl-9-xanthenyl)urea

N-(2-furoyloxy)-N-(2-methyl-9-xanthenyl)urea

N-methylthioacetoxy-N-(2-methyl-9-xanthenyl)urea

N'-(2-acetoxyethyl)-N-methoxyacetoxy-N-(2-methyl-9-xanthenyl)-urea

N-acetoxy-N'-methyl-N-(2-methyl-9-xanthenyl)urea

N'-methyl-N-methylthioaceptoxy-N-(2-methyl-9-xanthenyl)urea

N-acetoxy-N'-acetyl-N-(2-methyl-9-xanthenyl)urea

N'-acetyl-N-(2-furoyloxy)-N-(2-methyl-9-xanthenyl)urea

N'-acetyl-N-crotonyloxy-N-(2-methyl-9-xanthenyl)urea

N'-acetyl-N-methylthioacetoxy-N-(2-methyl-9-xanthenyl)urea

N-acetoxy-N'-acetyl-N-(1-fluoro-9-xanthenyl)urea

N'-acetyl-N-(1-fluoro-9-xanthenyl)-N-(2-furoyloxy)urea

N'-acetyl-N-crotonyloxy-N-(1-fluoro-9-xanthenyl)urea

N'-acetyl-N-(1-fluoro-9-xanthenyl)-N-methylthioacetoxyurea

In a similar manner the following compounds are prepared using phenyl isocyanate and methyl isocyanate respectively:

N-phenylcarbamoyloxy-N-9-xanthenylurea, m.p. 170°–172° C

N'-methyl-N-methylcarbamoyloxy-N-9-xanthenylurea, m.p. 186° C.

EXAMPLE 2

A solution of cyclohexanecarbonyl chloride (0.012 mole) in dry pyridine (25 ml.) at 0° C. was mixed with a solution of N-hydroxy-N-9-xanthenylurea (0.01 mole) in dry pyridine (25 ml.) at 0° C., and then the procedure of Example 1 was followed to give N-cyclohexanecarbonyloxy-N-9-xanthenylurea, m.p. 155°–158° C.

In a similar manner the following compounds are prepared:

N-benzoyloxy-N-9-xanthenylurea, m.p. 165°–166° C.

N-(2-furoyloxy)-N-9-xanthenylurea, m.p. 164°–165° C.

N-(2-thenoyloxy)-N-9-xanthenylurea, m.p. 151°–153° C.

N-nicotinoyloxy-N-9-xanthenylurea, m.p. 164°–166° C.

N-octanoyloxy-N-9-xanthenylurea, m.p. 121°–122° C.

N-stearyloxy-N-9-xanthenylurea, m.p. 90°–93° C.

N-isobutyryloxy-N-9-xanthenylurea, m.p. 156.5°–159.5° C.

N-pivaloyloxy-N-9-xanthenylurea, m.p. 155°–158° C.

N-cyclohexaneactoxy-N-9-xanthenylurea, m.p. 153°–156° C.

N-(2-benzothenoyloxy)-N-9-xanthenylurea, m.p. 166°–167° C.

N-(2-tetrahydrofuroyloxy)-N-9-xanthenylurea, m.p. 157°–160° C.

N-(2-benzofuroyloxy)-N-9-xanthenylurea, m.p. 150°–151° C.

N-ethoxalyloxy-N-9-xanthenylurea, m.p. 137°–139° C.

N-(2-tetrahydrothenoyloxy)-N-9-xanthenylurea, m.p. 138°–141° C.

N-phenoxyacetoxy-N-9-xanthenylurea, m.p. 129°–131° C.

N-benzothiazolylcarbonyloxy-N-9-xanthenylurea, m.p. 152°–154° C.

N-phenylacetoxy-N-9-xanthenylurea, m.p. 145°–147° C.

N-cyclobutanecarbonyloxy-N-9-xanthenylurea, m.p. 167°–170° C.

N-cyclopentanecarbonyloxy-N-9-xanthenylurea, m.p. 166°–168° C.

N-(3-methoxycarbonylpropionyloxy)-N-9-xanthenylurea m.p. 144°–145° C.

N-(2,2-dimethylbutyryloxy)-N-9-xanthenylurea, m.p. 115°–117° C.

N-triethylacetoxy-N-9-xanthenylurea, m.p. 125°–126° C.

N'-(2-acetoxyethyl)-N-benzoyloxy-N-9-xanthenylurea, m.p. 140° C.

N-isobutyryloxy-N'-methyl-N-9-xanthenylurea, m.p. 168°–170° C.

N-benzoyloxy-N'-methyl-N-9-xanthenylurea, m.p. 179°–180° C.

N-benzoyloxy-N-(1-fluoro-9-xanthenyl)urea, m.p. 175°–177° C.

N-benzoyloxy-N-(2-methyl-9-xanthenyl)urea,

N-cyclohexanecarbonyloxy-N'-(2-methoxyethyl)-N-9-xanthenylurea

EXAMPLE 3

Ethyl chloroformate (2 ml.) was added dropwise to dry pyridine cooled to −20° C. To this solution was added N-hydroxy-N-9-xanthenylurea (1.3 g.) in dry pyridine (15 ml.) and the resulting mixture was stirred and allowed to come to room temperature over 45 minutes. On dilution with ice-water, a solid was obtained which was recrystallised from acetone/light petroleum to give N-ethoxycarbonyloxy-N-9-xanthenylurea, m.p. 164°–168° C.

In a similar manner the following compounds are prepared:

N-methoxycarbonyloxy-N-9-xanthenylurea, m.p. 160°–161.5° C.

N-phenoxycarbonyloxy-N-9-xanthenylurea, m.p. 150°–151° C.

N-(2-methoxyethoxy)carbonyloxy-N-9-xanthenylurea, m.p. 148°–152° C.

N-prop-2-unyloxycarbonyloxy-N-9-xanthenylurea, m.p. 150°–156° C.

N-allyloxycarbonyloxy-N-9-xanthenylurea, m.p. 148°–151° C.

N-(2-chloroethoxy)carbonyloxy-N-9-xanthenylurea, m.p. 147°–149° C.

N-(2-cyanoethoxy)carbonyloxy-N-9-xanthenylurea, m.p. 138°–141° C.

N-(2-phenoxyethoxy)carbonyloxy-N-9-xanthenylurea, m.p. 152°–154° C.

N-cyclohexyloxycarbonyloxy-N-9-xanthenylurea, m.p. 151°–152° C.

N-ethoxycarbonylmethoxycarbonyloxy-N-9-xanthenylurea, m.p. 132°–134° C.

N-cyclohexylmethoxycarbonyloxy-N-9-xanthenylurea, m.p. 141°–144° C.

N-(2,2,2-trichloroethoxy)carbonyloxy-N-9-xanthenylurea, m.p. 146° C.

N-2-(2-ethoxyethoxy)ethoxycarbonyloxy-N-9-xanthenylurea, m.p. 85°–87° C.

N-(2-methyl-2-nitro)propyloxycarbonyloxy-N-9-xanthenylurea, m.p. >110° C.

N-2-phenylethoxycarbonyloxy-N-9-xanthenylurea, m.p. 118°–120° C.

N-methoxycarbonyloxy-N'-methyl-N-9-xanthenylurea, m.p. 139°–141° C.

N-ethoxycarbonyloxy-N'-methyl-N-9-xanthenylurea, m.p. 171°–175° C.

N-(2-methoxyethoxy)carbonyloxy-N'-methyl-N-9-xanthenylurea, m.p. 140°–141° C.

N-ethoxycarbonyloxy-N-(2-methyl-9-xanthenyl)urea

N-ethoxycarbonyloxy-N-(1-fluoro-9-xanthenyl)urea

N-(1-fluoro-9-xanthenyl)-N-phenoxycarbonyloxyurea

N-(2-chloroethoxy)carbonyloxy-N-(1-fluoro-9-xanthenyl)urea

N-cyclohexyloxycarbonyloxy-N-(1-fluoro-9-xanthenyl)urea
N-ethoxycarbonyloxy-N-(1-methoxy-9-xanthenyl)urea
N-(1-methoxy-9-xanthenyl)-N-phenoxycarbonyloxyurea
N-methoxycarbonyloxy-N-(2-methyl-9-xanthenyl)urea
N-(2-cyanoethoxy)carbonyloxy-N-(2-methyl-9-xanthenyl)urea
N-(2-methoxyethoxy)carbonyloxy-N-(2-methyl-9-xanthenyl)urea
N-(2-methyl-9-xanthenyl)-N-(2-phenylethoxy)carbonyloxyurea
N-methoxycarbonyloxy-N'-methyl-N-(2-methyl-9-xanthenyl)urea
N'-methyl-N-(2-methyl-9-xanthenyl)-N-(2-phenylethoxy) carbonyloxyurea
N-(2-cyanoethoxy)carbonyloxy-N-(1-methoxy-9-xanthenyl)urea
N-(2-methoxyethoxy)carbonyloxy-N-(1-methoxy-9-xanthenyl)urea
N'-(2-acetoxyethyl)-N-ethoxycarbonyloxy-N-9-xanthenylurea
N'-(2-acetoxyethyl)-N-ethoxycarbonyloxy-N-(1-fluoro-9-xanthenyl)urea
N'-(2-acetoxyethyl)-N-ethoxycarbonyloxy-N-(1-methoxy-9-xanthenyl)urea
N'-(2-acetoxyethyl)-N-ethoxycarbonyloxy-N-(2-methyl-9-xanthenyl)urea
N'-(2-acetoxyethyl)-N-phenoxycarbonyloxy-N-9-xanthenylurea
N'-(2-acetoxyethyl)-N-(1-fluoro-9-xanthenyl)-N-phenoxycarbonyloxyurea
N'-(2-acetoxyethyl)-N-(1-methoxy-9-xanthenyl)-N-phenoxycarbonyloxyurea
N'-(2-acetoxyethyl)-N-(2-methyl-9-xanthenyl)-N-phenoxycarbonyloxyurea
N'-acetyl-N-ethoxycarbonyloxy-N-9-xanthenylurea
N'-acetyl-N-ethoxycarbonyloxy-N-(1-fluoro-9-xanthenyl)urea
N'-acetyl-N-ethoxycarbonyloxy-N-(1-methoxy-9-xanthenyl)urea
N'-acetyl-N-ethoxycarbonyloxy-N-(2-methyl-9-xanthenyl)urea
N'-acetyl-N-phenoxycarbonyloxy-N-9-xanthenylurea
N'-acetyl-(1-fluoro-9-xanthenyl)-N-phenoxycarbonyloxyurea
N'-acetyl-(1-methoxy-9-xanthenyl)-N-phenoxycarbonyloxyurea
N'-acetyl-(2-methyl-9-xanthenyl)-N-phenoxycarbonyloxyurea

EXAMPLE 4

A solution of formic acetic anhydride in tetrahydrofuran (39 ml.) (prepared by heating acetic anhydride (9.4 ml.) and 98 percent formic acid (3.8 ml.) at 50°–60° C. for 2 hours, cooling, and diluting to 50 ml. with tetrahydrofuran) was added dropwise to a solution of N-hydroxy-N-9-xanthenylurea (6.14 g.) in dimethylformamide (75 ml.). After 2 days at room temperature the mixture was filtered into ice/water and the precipitate was collected after stirring for 15 minutes at 0°–2° C. Recrystallisation from acetone/petroleum ether b.p. 62°–68° C. gave N-formyloxy-N-9-xanthenylurea, m.p. 157°–159° C.

EXAMPLE 5

In the preparation of tablets, mixtures of the following type may be tabletted in conventional manner:

| | |
|---|---|
| Compound of formula I | 10–90% |
| Calcium phosphate | 0–80% |
| Maize starch | 5–10% |
| Magensium stearate | ca.1% |
| Microcrystalline cellulose | 0–90% |
| | (by weight) |

EXAMPLE 6

The following mixture was formed into tablets in conventional manner, each tablet containing 50 mg. of active ingredient:

| | |
|---|---|
| N-acetoxy-N-9-xanthenylurea | 25% |
| Maize starch | 10% |
| Calcium phosphate | 20% |
| Magnesium stearate | 1% |
| Microcrystalline cellulose | to 100 by weight |

EXAMPLE 7

In the preparation of enteric coated tablets, tablets prepared as described in Example 6 were coated with sanderac varnish and then coated with cellulose acetate phthalate using a solution of 20 percent cellulose acetate phthalate and 3 percent diethyl phthalate in a mixture of equal parts of industrial alcohol and acetone.

EXAMPLE 8

In the preparation of tablets, the following mixture was dry granulated and compressed in a tabletting machine to give tablets containing 5 mg. of active ingredient:

| | |
|---|---|
| N-acetoxy-N-9-xanthenylurea | 10 g. |
| lactose | 5 g. |
| calcium phosphate | 5 g. |
| maize starch | 5 g. |

EXAMPLE 9

In the preparation of enteric coated tablets, the tablets described in Example 8 were given a thin coat of shellac followed by 20 coats of cellulose acetate phthalate.

EXAMPLE 10

In the preparation of capsules, a mixture of the ingredients described in Example 8 was encapsulated in hard gelatin capsules. Enteric coating was applied by conventional dipping in cellulose acetate phthalate.

EXAMPLE 11

The following mixture was compressed into tablets in conventional manner:

| | |
|---|---|
| N-acetoxy-N-9-xanthenylurea | 25% |
| Sodium bicarbonate | 75% |
| peppermint oil | q.s. |

EXAMPLE 12

In the preparation of capsules, a mixture of equal parts by weight of N-acetoxy-N-9-xanthenylurea and calcium phosphate was encapsulated in hard gelatin capsules, each capsule containing 50 mg. of N-acetoxy-N-9-xanthenylurea.

EXAMPLE 13

In the preparation of enteric coated capsules, the capsules of Example 12 were coated with cellulose acetate phthalate in conventional manner.

EXAMPLE 14

Suppositories weighing 1 g. and containing 50 mg. of N-acetoxy-N-9-xanthenylurea were prepared in conventional manner using a base consisting of:

| | |
|---|---|
| Polyethylene glycol 4000 | 33% |
| Polyethylene glycol 6000 | 47% |
| Water | 20% |

EXAMPLE 15

A solution for parenteral administration was prepared by dissolving 100 mg. of N-acetoxy-N-9-xanthenylurea in 2 ml. of propylene glycol and sterilised by filtration.

Compositions similar to those described in Examples 5 – 15 are also prepared, containing compounds of Examples 1 – 3 in place of N-acetoxy-N-9-xanthenylurea.

We claim:

1. A compound of the formula

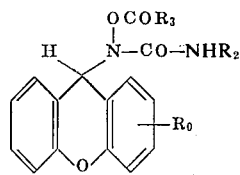

in which $R_o$ is hydrogen, halogen, alkoxy or alkyl;

$R_2$ is hydrogen, alkyl, alkanoyloxyalkyl or alkoxyalkyl;

and $R_3$ is hydrogen; alkyl containing 1–17 carbon atoms; alkyl containing a single substituent selected from alkoxy, alkylthio, phenoxy, phenyl, cycloalkyl and alkoxycarbonyl; alkenyl; cycloalkyl; alkoxycarbonyl; alkoxy; alkoxy containing a single substituent selected from alkoxy, phenoxy, cycloalkyl, alkoxycarbonyl, halogen, cyano, alkoxyalkoxy, nitro and phenyl; phenoxy; alkenyloxy; alkynyloxy or cycloalkoxy;

and wherein the terms "alkyl," "cycloalkyl," "alkoxy," "alkylthio," "alkenyl," "alkenyloxy," "alkynyloxy," "cycloalkoxy" and "alkanoyloxy," indicate such groups containing up to seven carbon atoms (unless otherwise specified).

2. A compound according to claim 1 in which $R_o$ is hydrogen or 1-alkoxy.

3. A compound of the formula

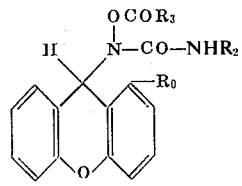

in which $R_o$ is hydrogen or alkoxy containing 1–7 carbon atoms;

$R_2$ is hydrogen or alkyl containing 1–7 carbon atoms;

and $R_3$ is alkyl containing 1–17 carbon atoms.

4. A compound according to claim 3 in which $R_o$ and $R_2$ are hydrogen.

5. The compound of claim 3 which is N-acetoxy-N-9-xanthenylurea.

6. The compound of claim 3 which is N-propionyloxy-N-9-xanthenylurea.

7. The compound of claim 3 which is N-acetoxy-N'-methyl-N-9-xanthenylurea.

8. The compound of claim 3 which is N-propionyloxy-N'-methyl-N-9-xanthenylurea.

* * * * *

UNITED STATES PATENT OFFICE
CERTIFICATE OF CORRECTION

Patent No. 3,855,244     Dated December 17, 1974

Inventor(s) Stewart Sanders ADAMS, Bernard J. ARMITAGE, Norman W. BRISTOW and Bernard V. HEATHCOTE It is certified that error appears in the above-identified patent and that said Letters Patent are hereby corrected as shown below:

Assignee: THE BOOTS COMPANY LIMITED
Nottingham, England

Signed and Sealed this fifth Day of August 1975

[SEAL]

Attest:

RUTH C. MASON
*Attesting Officer*

C. MARSHALL DANN
*Commissioner of Patents and Trademarks*